(12) United States Patent
Engman et al.

(10) Patent No.: US 10,412,470 B2
(45) Date of Patent: Sep. 10, 2019

(54) EVENT ENTERTAINMENT SYSTEM

(71) Applicants: Matthew A. F. Engman, Fort Wayne, IN (US); Martin L. S. Engman, Fort Wayne, IN (US)

(72) Inventors: Matthew A. F. Engman, Fort Wayne, IN (US); Martin L. S. Engman, Fort Wayne, IN (US)

( * ) Notice: Subject to any disclaimer, the term of this patent is extended or adjusted under 35 U.S.C. 154(b) by 0 days.

(21) Appl. No.: 14/681,894

(22) Filed: Apr. 8, 2015

(65) Prior Publication Data

US 2015/0289034 A1    Oct. 8, 2015

Related U.S. Application Data

(60) Provisional application No. 61/977,071, filed on Apr. 8, 2014.

(51) Int. Cl.
| | |
|---|---|
| *H04Q 9/00* | (2006.01) |
| *A63F 13/211* | (2014.01) |
| *A63F 13/828* | (2014.01) |
| *A63F 13/28* | (2014.01) |
| *A63F 13/355* | (2014.01) |
| *A63F 13/235* | (2014.01) |
| *A63F 13/54* | (2014.01) |
| *G09F 27/00* | (2006.01) |
| *H04L 29/08* | (2006.01) |
| *G09F 19/08* | (2006.01) |
| *H04W 4/80* | (2018.01) |

(52) U.S. Cl.
CPC .............. *H04Q 9/00* (2013.01); *G09F 19/08* (2013.01); *G09F 27/00* (2013.01); *H04L 67/26* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 5,941,989 A | * | 8/1999 | Klein | G06F 1/26 340/550 |
| 6,945,882 B2 | * | 9/2005 | Strong | G07C 1/28 340/323 R |

(Continued)

FOREIGN PATENT DOCUMENTS

WO    2014100832 A3    2/2015

*Primary Examiner* — Chico A Foxx
(74) *Attorney, Agent, or Firm* — Richards Patent Law P.C.

(57) ABSTRACT

An event entertainment system including a first wearable device associated with a first competitive participant, a second wearable device associated with a second competitive participant, and a hub that receives and wirelessly broadcasts data related to one or more contests; wherein the data related to the one or more contests includes a stream of events related to at least the first competitive participant and the second competitive participant, wherein the data for each event identifies an outcome and an associated competitive participant, wherein the first wearable device and the second wearable device includes a wireless communication module that receives the data related to the one or more contests, wherein, in response to a first trigger event, the first wearable device performs an action and the second wearable device does not perform the action, wherein the first trigger event includes a first outcome associated with the first competitive participant.

19 Claims, 9 Drawing Sheets

(56) References Cited

U.S. PATENT DOCUMENTS

| | | | | |
|---|---|---|---|---|
| 7,020,336 | B2* | 3/2006 | Cohen-Solal | H04N 5/222 348/157 |
| 7,543,322 | B1* | 6/2009 | Bhogal | H04N 5/44543 725/38 |
| 7,883,418 | B2* | 2/2011 | Hiroyama | A63F 13/12 463/20 |
| 8,253,586 | B1* | 8/2012 | Matak | H04Q 9/00 340/870.07 |
| 8,412,167 | B1* | 4/2013 | Koller | H04W 4/06 370/294 |
| 8,485,879 | B2* | 7/2013 | Lin | A63B 69/004 273/455 |
| 8,506,408 | B2* | 8/2013 | Backer | A63F 13/31 463/39 |
| 8,647,201 | B1* | 2/2014 | Jehamy | A63F 13/65 463/31 |
| 8,702,504 | B1* | 4/2014 | Hughes | G06F 3/04842 463/29 |
| 8,786,415 | B2* | 7/2014 | Cavallaro | A63B 24/0021 340/323 R |
| 8,892,220 | B2* | 11/2014 | Kotb | H05B 37/0272 362/103 |
| 8,948,839 | B1* | 2/2015 | Longinotti-Buitoni | A61B 5/6804 29/825 |
| 8,949,895 | B2* | 2/2015 | Shanks | H04N 5/44543 725/38 |
| 9,216,319 | B2* | 12/2015 | DeAngelis | A63B 24/0021 |
| 9,305,441 | B1* | 4/2016 | Cronin | G08B 7/06 |
| 2004/0045038 | A1* | 3/2004 | Duff | H04N 21/858 725/133 |
| 2005/0159221 | A1* | 7/2005 | Kamikawa | A63F 13/12 463/42 |
| 2005/0277466 | A1* | 12/2005 | Lock | G06T 7/0044 463/30 |
| 2006/0154751 | A1* | 7/2006 | Huntsberger | A63B 24/0021 473/433 |
| 2007/0022029 | A1* | 1/2007 | Ma | G06Q 40/02 705/35 |
| 2007/0037638 | A1* | 2/2007 | Rumfola, III | A63B 63/083 473/433 |
| 2008/0088421 | A1 | 4/2008 | McMillan et al. | |
| 2008/0146302 | A1* | 6/2008 | Olsen | A63F 13/213 463/7 |
| 2009/0064257 | A1* | 3/2009 | Oehm | H04N 7/17318 725/119 |
| 2009/0111582 | A1* | 4/2009 | Schuler | A63B 24/0021 463/42 |
| 2009/0131165 | A1* | 5/2009 | Buchner | A63F 13/02 463/30 |
| 2010/0128753 | A1* | 5/2010 | Claypool | G01K 1/02 374/102 |
| 2010/0283630 | A1* | 11/2010 | Alonso | H04Q 9/00 340/870.11 |
| 2011/0065489 | A1* | 3/2011 | Fleischman | A63F 3/00157 463/11 |
| 2011/0081965 | A1* | 4/2011 | Klein | A63F 13/12 463/31 |
| 2011/0165946 | A1* | 7/2011 | Pavlich | G07F 17/32 463/42 |
| 2011/0181418 | A1* | 7/2011 | Mack | A42B 3/046 340/573.1 |
| 2012/0176774 | A1* | 7/2012 | Hermann, II | G08B 5/36 362/103 |
| 2013/0066448 | A1* | 3/2013 | Alonso | H04Q 9/00 700/91 |
| 2013/0095924 | A1* | 4/2013 | Geisner | A63F 13/00 463/32 |
| 2013/0233043 | A1* | 9/2013 | Kelly | G01B 21/16 73/1.01 |
| 2014/0004939 | A1* | 1/2014 | Kasten | A63F 13/12 463/30 |
| 2014/0184386 | A1 | 7/2014 | Regler et al. | |
| 2014/0364974 | A1* | 12/2014 | Wohl | G06K 7/10227 700/91 |
| 2015/0002385 | A1* | 1/2015 | Mankowski | G06F 3/017 345/156 |
| 2015/0035644 | A1* | 2/2015 | June | G07C 11/00 340/5.61 |
| 2015/0149296 | A1* | 5/2015 | Melcher | G06Q 30/0269 705/14.66 |
| 2015/0187188 | A1* | 7/2015 | Raskin | G08B 6/00 340/407.1 |
| 2016/0134737 | A1* | 5/2016 | Pulletikurty | G06F 3/0227 715/735 |

* cited by examiner

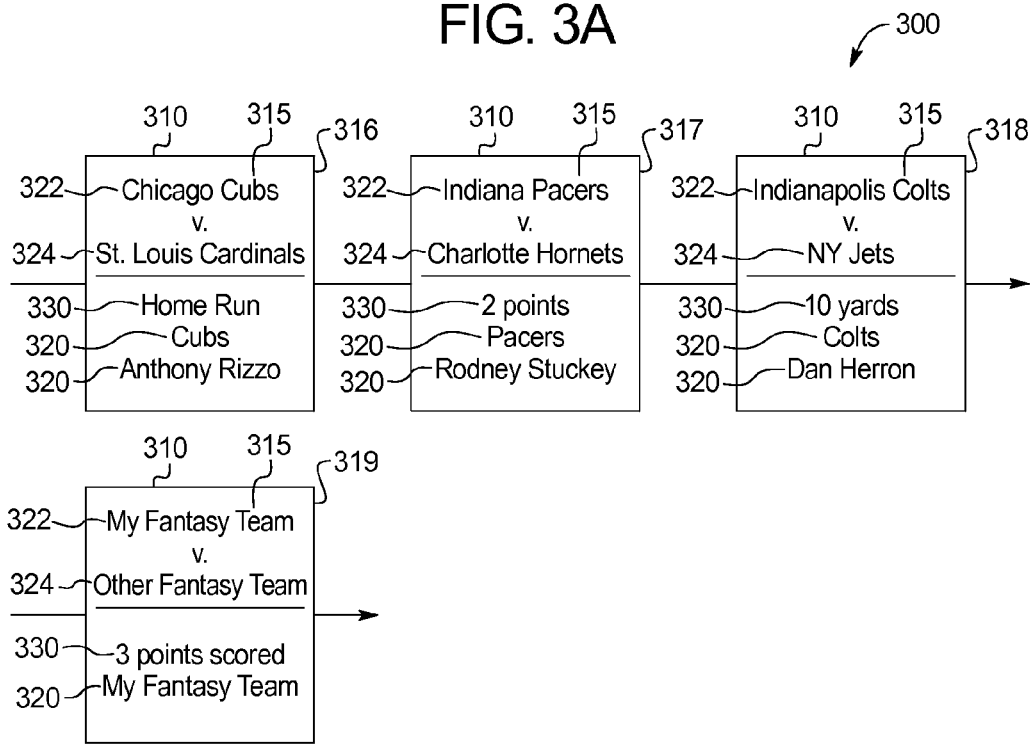

EVENT ENTERTAINMENT SYSTEM

CROSS-REFERENCE TO RELATED APPLICATIONS

This application incorporates by reference and claims the benefit of priority to U.S. Provisional Patent Application No. 61/977,071, filed Apr. 8, 2014.

BACKGROUND OF THE INVENTION

The present subject matter relates generally to a system of devices used to communicate information about entertainment and sporting events. More specifically, the present invention relates to a system whereby entertainment and sporting event spectators may receive information about and dynamically experience the event they are watching and other events without looking at other external devices or consulting outside sources.

There are thousands of sports games being played every day across the country, including professional, amateur, collegiate, club and high school, as well as "pee-wee" and summer camp sports. The multitude of different sporting events taking place in this country is astounding, with basketball, baseball, and football being three of the most popular in the US today. For each game that is being played there are thousands of dedicated fans following the action through numerous mediums. Only a small percentage of the total fan base are able to attend the event in person, leaving thousands of other fans who are unable to attend each and every game that they are interested in. The sports industry has gone to great lengths to provide the consumer fan base with portals of engagement with the action. Some of the mediums that are utilized today to connect with those fans are television, radio and Internet web pages. These individual sites or channels are dedicated to broadcasting the play-by-play action to individuals who are unable to attend the event in person or even provide additional, detailed information for those in attendance.

By utilizing the technology available today, fans in attendance and those unable to attend are able to watch the television and receive live broadcast of the action. They are able to watch broadcasts on their television, smartphone, or home computer. No matter where the individual is located, they have access to the latest sports information utilizing these different media channels available today.

But there is a gap in the technology being used to connect sports fans to sporting events. While attending a sporting event, individual fans look up scores, stats, and other details on their mobile phone. Additionally, fans who watch the event on television from their home or other location often search using a laptop computer. This dedicated action of searching the web on their laptop, interacting with an "app" on their mobile phone, or reading a text message that was automatically sent to their phone takes the fan's attention off of the game on the field. Some of these webpages or apps require multiple keystrokes of the laptop or mobile phone. Each of these keystrokes or events that require the individual's attention distances the fan from the action on the field, around them in the stands or bleachers, or in the living room or bar setting. This disconnects the individual fan from where their primary attention is intended to be. Because interacting with mobile devices can be distracting at times, a need exists for a device that is able to visually, audibly, or through tactile sensation alert all individuals in the proximity to what occurs during the sporting event without being of primary visual or audible focus.

Additionally, a need exists for a device that is scalable and that works with multiple alert devices simultaneously with minimal setup required. This would cater to and engage fans who do not presently own laptops or smartphones, or are truly spectators.

Another need exists for a standard platform for sports memorabilia products to simultaneously display the data and engage fans for the multiple different types of sports, teams, events, and statistics that the individuals in proximity are interested in. A need also exists for a standard platform for the sports memorabilia products to be usable at multiple different venues, including, but not limited to, an individual's house, a neighbor's house, a motor vehicle, a bar or pub, and while in attendance of the specific event.

BRIEF SUMMARY OF THE INVENTION

To meet the needs described above and others, the present disclosure provides an event entertainment system of devices for displaying information about sporting events in a way that is easy for spectators to observe.

The event entertainment system may include an electronic base unit (hereinafter, hub) that is able to receive and transmit specific data. Working in conjunction with the hub are various peripheral devices (hereinafter, peripherals) whose functions are activated wirelessly by a signal received from, and transmitted by, the hub.

For example, a user may be a fan of a particular sports team. The user may adorn her walls and shelves and wear a plurality of peripherals that are programmed to instantly and simultaneously be activated to perform actions when her favorite team scores. The actions that the peripherals perform may be specific to each type of peripheral and provide additional alerts to the user without taking her attention away from the game while at the event, while watching a televised broadcast, or while working in the office. The user, and those around her, may experience the lights, sounds, and tactile sensation created by the plurality of peripherals in unison, creating more engagement in the action of the contest.

The hubs may receive data from remote sources over a network, such as the Internet. The user may place a hub in her home near an Internet source so that it has a connection to the remote sources, such as cloud servers, that transmit data reflecting events, such as scoring points, that occur during one or more contests. The events, in turn, may trigger functionality of the event entertainment system, such as actions performed by the peripherals. In some embodiments, the hub may perform actions in response to an event as if it were a peripheral. In other words, in some embodiments, a hub and peripheral may be provided as a single unit. After processing, the data may be broadcast to surrounding peripherals.

The peripherals may include jerseys, hats, signs, scoreboards, busts, etc. Some peripherals may be wearable devices, such as, the jersey and hat. In some embodiments, other wearable devices may include, for example, a headband, wristband, pants, etc. The peripherals may include integrated electronic components (peripheral electronics) that may be enclosed in plastic, rubber, or metal housings.

The hub may include electrical control components to connect and communicate with a remote source and to broadcast to nearby peripherals. The hub may include a controller to carry out the functionality described herein. The functionality of the hub may be provided by stored instructions (also referred to herein as logic) located in a memory.

Similarly, each peripheral may include peripheral electronics. The peripherals electronics may be provided as integrated computer units that have radio frequency receiving circuitry and antenna(s). The peripheral electronics may be adapted to allow for a variety of specific actions and peripheral design styles, achieved by different models of peripherals, all with similar requirements for receiving communication from the hub. The peripheral electronics may be provided as a roughly 1"×1" square component that may fit within a variety of different peripherals. The peripheral electronics may include a controller for controlling the peripheral and a memory for storing instructions for carrying out the functionality described herein. The controller may be powered by one or more batteries. The peripheral electronics may further include openings for connector jack(s) and antenna(s). The peripheral electronics may include, or may be connected to various audio-visual sensory outputs such as lights, a vibrating motor, a speaker, buzzers, etc. Additionally, the peripheral electronics may include, or may be connected to various input devices, such as microphones, accelerometers, GPS sensors, etc.

As noted, the hub receives data for contests and broadcasts it to the peripherals. In an embodiment, the hub will track and broadcast data for multiple contests based on selections made by the user. The user may select the contests in a setup menu of the hub, as described further herein. The hub may be scalable and able to transmit data for numerous specified contests in near real-time.

The data may include a series of events relating to one or more contests. In an embodiment, each contest includes at least two competitive participants representing the competing parties in the contest. Each event may relate to an outcome for one of the contests. Outcomes may include scoring, assists, hits, fouls, stolen bases, run, yards gained, yards lost, plays, downs completed, change of period, out-of-bounds, turnovers, penalties, bonuses, substitutions, etc. Each outcome may, in turn, include associated competitive participants.

In an embodiment, a triggering event triggers an associated action or actions to be performed by the peripheral. A key may be preprogrammed information stored in the memory of the peripheral that is matched with events received by the peripheral to find matching triggering events. Each key may include one or more competitive participants and one or more outcomes for matching with received events. Each key may have associated actions. The actions associated with each key may be distinct to permit the user to distinguish different triggering events and permit the user to understand what has occurred. Trigger events may be created for any outcome, including scoring events, a pass, a penalty, a send-off, an error, a turnover, etc.

Actions may include activating lights, playing sounds, creating vibration, or other various audio, visual, or tactile stimuli. Actions may be provided in various patterns and combinations to create unique and varying stimuli.

Each peripheral may include a different mapping of keys to actions. For example, a first user and a second user may be rooting for different teams while watching a sports contest. The first user may be wearing a jersey for a first participant while the second user is wearing a jersey for the second participant. Each jersey may have a key in its memory corresponding to the team displayed on the jersey. Thus, when the first participant's team scores, his jersey may light up and vibrate as dictated by the preprogrammed action while the jersey worn by the second user performs no action.

In an embodiment, a peripheral may be wearable device such as a sports jersey. The jersey may include lights arranged on the surface of the jersey in various possible patterns. The jersey may include a tactile sensation device that, upon activation by receiving the triggering event, creates a tactile sensation for the user wearing the jersey. The light, tactile sensation device, etc., may be electrically connected to the peripheral electronics that may be attached to the jersey at an unobtrusive location.

In another embodiment, a peripheral may be a wearable device such as a hat. According to an additional embodiment, the peripheral may be an acrylic sign of the sports team logo. The sign may include multiple LED lights that, upon activation, display varying patterns of illumination. In yet another embodiment, the peripheral may be provided as a wall-mounted scoreboard. The scoreboard may display the team names above the respective scores for each team. In a further embodiment, the peripheral may be provided as a bust of resemblance to a sports figure. The bust may be provided in the likeness of a famed baseball commentator, such that, when a participant scores, the associated action may trigger simultaneous motion of a jaw, mouth, and eyes of the bust while the speaker plays a sound clip of the well-known commentator in order to create a virtual likeness.

The event entertainment system may include two-way communication between peripherals to create actions that are coordinated across peripherals. In an exemplary use case, a user wearing a wearable device, such as a jersey, may be in a stadium enjoying a sports contest. To amplify the energy and excitement of the contest, the wearable devices may include activated sensory outputs such as lights, speakers, vibrating motors, tactile sensation device, etc., that when activated light up, make sound, or vibrate in response to the activity of the user and nearby users. For example, if the user moves quickly by waving her hands, jumping up and down, rocking back and forth, etc., the activated sensory outputs may be activated.

Additionally, via two-way communication, the motion of one user may activate the wearable device of nearby users. For example, the activity of a first user wearing a first wearable device may broadcast a signal that causes a second wearable device worn by a second user to light up. In the extreme, the wearable devices may form a network across the stadium, such that when activity in a particular area reaches an activation point, the activation of the wearable devices spreads out in a wave across the stadium. For clarity, although some functionality herein is described with reference to wearable devices, it is understood that any peripheral may benefit from the described functionality, and, accordingly all descriptions of the functionality of wearable devices is intended to apply equally to any peripheral.

In an embodiment, a first wearable device may include an activity measurement device to measure the activity of the user. The activity measurement device may be or include an accelerometer, or in other embodiments, the activity measurement device may be or include a microphone. The activity of the user measured by the activity measurement device may activate an activated output of the sensory output device, such as turning on the lights.

The sensory output device may display an activated output when the user activity exceeds a predetermined threshold level. As a user moves while cheering, the controller may receive acceleration data points from the accelerometer to determine an acceleration measurement. When the acceleration measurement exceeds the predetermined threshold level, the activated output of activating the lights may be enabled.

In an embodiment, an activation level of the activated output is set proportional to the measured user activity. For example, when the user activity is measured using an acceleration measurement from the accelerometer, the activated output may be set at an intensity level proportional to the acceleration measurement. As another example, when the user activity is measured using an audio input measurement, the activation level of the activated output may be proportional to the audio input measurement.

The activated output of one wearable device may be influenced by the activity of other nearby users. In an embodiment, the intensity level of the activated output may be proportional to a signal received from another peripheral, such as a wearable device. A second wearable peripheral may broadcast a signal to the first wearable peripheral. The signal may include an activation level. In an embodiment, the activation level may be a measure of the user activity. For example, the activation level may be the acceleration measurement as measured by the second wearable peripheral. The controller may then activate the sensory output device to the intensity level proportional to the acceleration measurement. By providing wearable devices that react to the activity of nearby sports fans, it is believed the event entertainment system will encourage fans to increase their activity, thus increasing fan engagement and excitement.

Further, each wearable peripheral may broadcast a signal incorporating the activity it receives from other wearable peripherals. For example, a first wearable device may receive signals from a second wearable device and a third wearable device. The first wearable device may then integrate the signals from the second wearable device and the third wearable device and broadcast a new signal that may be observed by further wearable peripherals. Additionally, the first wearable device may additionally integrate its own activation level into the new signal. It is contemplated that any information measured by the first wearable device may be included in the new signal. By integrating signals and broadcasting new signals, each wearable device may amplify the activation level of all wearable devices to create increased energy and excitement at a sports contest.

The system may also work with non-sporting events to alert users to critical moments or to heighten the experience for fans. For example, a fan may use the system to follow a favorite contestant on a reality TV show. In another example, peripherals may be sold as t-shirts at a concert, which will then be activated throughout the concert to coordinate with the set list. The system could also be used in a symphony to highlight certain areas of the venue or to vibrate a peripheral upon a crescendo. It could be used on a cruise ship to alert travelers of different events taking place. In a corporate office, the system may signify the open or close of the market or act as a "ticker" to track sales and alert team members of a new sale. This may help drive competition and excitement among employees.

In the home or office, the system may alert users about new emails or social media events, such as "tweets." Corporations may also use the system in a social media context by illuminating a sign that displays trending "tweets." The trending sign may stay lit for a certain amount of time following a tweet, and the more tweets per day, the longer the sign stays lit. This could help to drive a marketing team's engagement with various campaigns.

In an embodiment, an event entertainment system includes: a first wearable device associated with a first competitive participant worn by a first person; a second wearable device associated with a second competitive participant worn by a second person; and a hub that receives and wirelessly broadcasts data related to one or more contests; wherein the data related to the one or more contests includes a stream of events related to at least the first competitive participant and the second competitive participant, wherein the data for each event identifies an outcome and an associated competitive participant, wherein the first wearable device and the second wearable device include wireless communication modules that receive the data related to the one or more contests, wherein, in response to a first trigger event, the first wearable device performs an action and the second wearable device does not perform the action, wherein the first trigger event includes a first outcome associated with the first competitive participant.

In an embodiment, the competitive participants are sports teams. And, in some embodiments, the competitive participants are sports players. Additionally, in some embodiments, the competitive participants are fantasy sports teams.

In some embodiments, the action is one of activating lights attached to the first wearable device, activating a vibrating motor of the first wearable device, and playing an audio recording through a speaker attached to the first wearable device. In other embodiments, the action is one or more of activating lights attached to the first wearable device, activating a vibrating motor of the first wearable device, and playing an audio recording through a speaker attached to the first wearable device.

In some embodiments, the first trigger event is one of a scoring event, a pass, a penalty, a send-off, an out, an error, and a turnover. And, in some embodiments, the first wearable device is one of a hat, a sign, an armband, a shirt, a bust, and a scoreboard.

In some embodiments, in response to a second trigger event, the first wearable device performs a second action, wherein the second trigger event includes a second outcome associated with a third competitive participant. Also, in some embodiments, the first wearable device further includes an accelerometer, a sensory output device, and a controller in communication with the accelerometer, the sensory output device, and the wireless communications module; wherein the sensory output device, when activated by the controller, produces an activated output, the activated output having a range of intensity levels, wherein in response to measuring an acceleration measurement from the accelerometer, the controller activates the activated output to a selected intensity level proportional to the acceleration measurement, wherein the controller broadcasts, via the wireless communication module, a first activation level derived from the acceleration measurement, and wherein the controller receives, via the wireless communication module, a second activation level from a second wearable device, wherein the controller activates the activated output to a selected intensity level proportional to the second activation level.

In some embodiments, the output device is a plurality of lights, wherein the activated output is the display of light from the lights, wherein the intensity levels are brightness levels of the displayed light. Also, in some embodiments, the output device is a speaker, wherein the activated output is the playback of sounds from the speaker, wherein the intensity levels are volume levels of the sounds. In some embodiments, the activation level is derived from a second acceleration measurement from a second accelerometer connected to the second wearable device. Further, in some embodiments, the controller broadcasts, via the wireless communication module, a third activation level derived from the acceleration measurement, and the activation level from the second wearable device.

In an embodiments, an event entertainment system includes: a first wearable device including an accelerometer, a sensory output device, a wireless communications module, and a controller in communication with the accelerometer, the sensory output device, and the wireless communications module; wherein the sensory output device, when activated by the controller, produces an activated output, the activated output having a range of intensity levels, wherein in response to measuring an acceleration measurement from the accelerometer, the controller activates the activated output to a selected intensity level proportional to the acceleration measurement, wherein the controller broadcasts, via the wireless communication module, a first activation level derived from the acceleration measurement, and wherein the controller receives, via the wireless communication module, a second activation level from a second wearable device, wherein the controller activates the activated output to a selected intensity level proportional to the second activation level.

In some embodiments, the output device is a plurality of lights, wherein the activated output is the display of light from the lights, wherein the intensity levels are brightness levels of the displayed light. Additionally, in some embodiments, the output device is a speaker, wherein the activated output is the playback of sounds from the speaker, wherein the intensity levels are volume levels of the sounds. Further, in some embodiments, the activation level is derived from a second acceleration measurement from a second accelerometer connected to the second wearable device. Even further, in some embodiments, the controller broadcasts, via the wireless communication module, a third activation level derived from the acceleration measurement, and the activation level from the second wearable device.

An object of the invention is to provide a way to dynamically experience and follow along with multiple sporting events.

Another object of the invention is to provide a solution to following sporting events that does not require the distraction of looking at a mobile device or computer.

An advantage of the invention is that it is scalable—users are able to add or subtract peripherals from the field of coverage with no setup necessary. Also, users may add multiple peripheral devices that each have a different associated action.

Another advantage of the invention is that there is no limit to the amount of peripherals the user may engage.

Yet another advantage is that the system does not require a line of sight to an infrared transmitter.

A further advantage is that the peripherals may be mobile, allowing the user to experience multiple sporting events while watching one sporting event live.

An advantage of the invention is that it provides a way to experience sporting events without requiring the user to check other sources, such as a website or alternate TV channel.

Another advantage of the invention is that it allows a user to focus on one primary sporting event while receiving information about other sporting events.

A further advantage of the invention is that it may create a fun and dynamic environment for watching sports.

Yet another advantage of the invention is that it may be used in conjunction with all levels and types of sports.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 3A is a diagram illustrating the data broadcast by the hub of FIG. 1.

FIG. 3B is a diagram illustrating keys and associated actions of a peripheral.

DETAILED DESCRIPTION OF THE DRAWINGS

Figure 1:
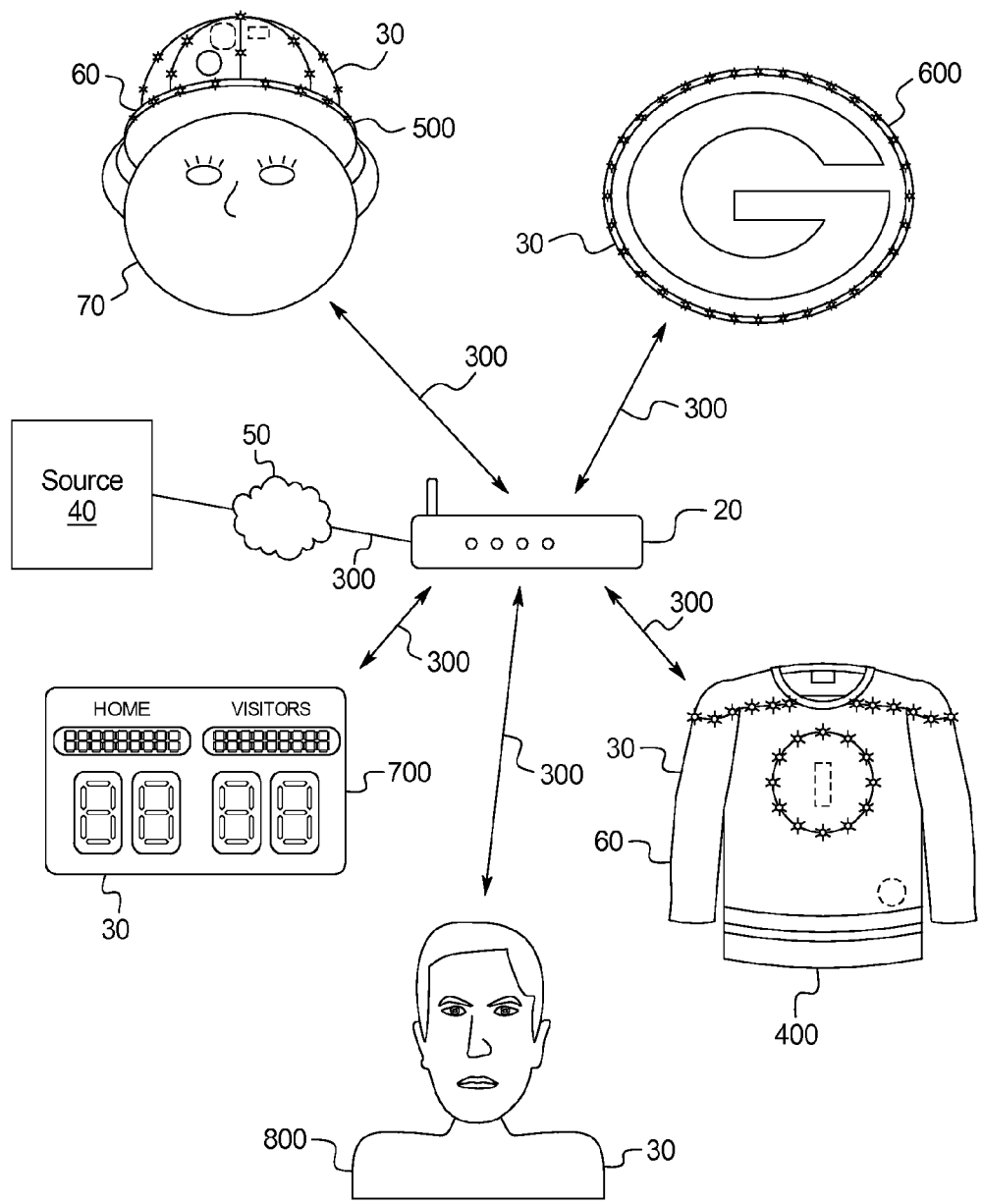
FIG. 1 is an example of the event entertainment system.

FIG. 1 illustrates an example embodiment of the event entertainment system 10. The event entertainment system 10 may include one or more electronic base units, called hubs 20. The hubs 20 work in conjunction with peripheral devices (peripherals 30) whose functions are activated wirelessly by a signal received from a source 40, and transmitted by the hub 20. For example, a user 70 may be a fan of a particular sports team. The user 70 may adorn her walls and shelves and wear a plurality of peripherals 30 that are programmed to instantly and simultaneously be activated to perform actions 340 (FIG. 3B) when her favorite team scores. The actions 340 that the peripherals 30 perform may be specific to each type of peripheral 30 and provide additional alerts to the user 70 without taking her attention away from the game while at the event, while watching a televised broadcast, or while working in the office. The user 70, and those around her, may experience the lights, sounds, and tactile sensation created by the plurality of peripherals 30 in unison, creating more engagement in the action of the contest.

The hubs 20 may receive data 300 from remote sources 40 over a network 50, such as the Internet. The user 70 may place a hub 20 in her home near an Internet source so that it has a connection to the remote sources 40, such as cloud servers, that transmit data 300 reflecting events 310, such as scoring points, that occur during one or more contests 315. The events 310, in turn, may trigger functionality of the event entertainment system 10, such as actions 340 performed by the peripherals 30. In some embodiments, the hub 20 may perform actions 340 in response to an event 310 as if it were a peripheral 30. In other words, in some embodiments, a hub 20 and peripheral 30 may be provided as a single unit. After processing, the data 300 may be broadcast to surrounding peripherals 30.

As shown in FIG. 1 and FIGS. 4-8B, the peripherals 30 may include jerseys 400, hats 500, signs 600, scoreboards 700, busts 800, etc. Some peripherals 30 may be wearable devices 60, such as, the jersey 400 and hat 500. In some embodiments, other wearable devices 60 may include, for example, a headband, wristband, pants, etc. The peripherals 30 may include integrated electronic components (peripheral electronics 280) that may be enclosed in plastic, rubber, or metal housings.

Figure 2A:
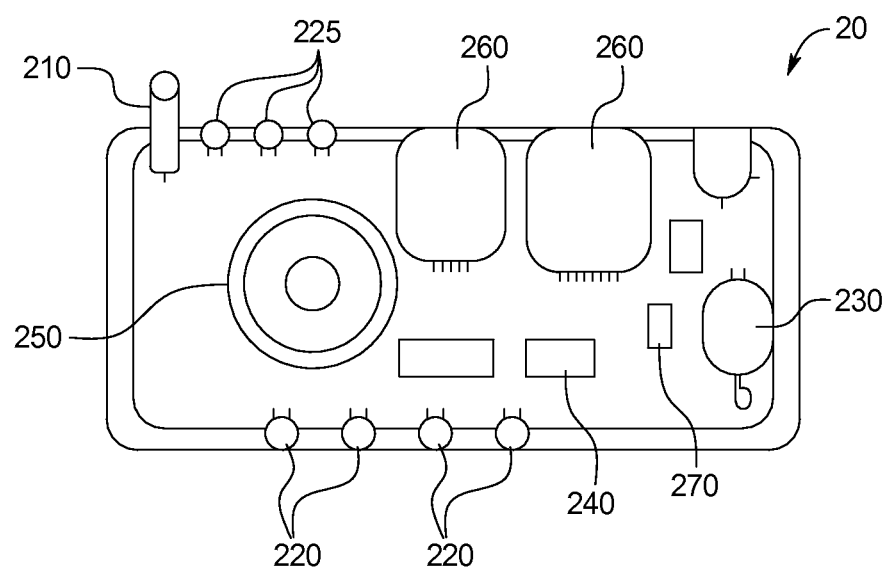
FIG. 2A is an example of hub electronics of the system of FIG. 1.

FIG. 2A illustrates the components of an example hub 20. The hub 20 may include electrical control components to connect and communicate with a remote source 40 and to broadcast to nearby peripherals 30. The hub 20 may include connection jacks 260 designated for various connections, such as, electrical power connections, Ethernet connections, Universal Serial Bus (USB) connections, etc., and antenna(s) 210 for Wi-Fi, Bluetooth, etc. The top face and front face of the housing may include cutouts for lights 220, such as LEDs 220, or any other lighted display. The hub 20 may include a controller 240 to carry out the functionality described herein. The functionality of the hub 20 may be provided by stored instructions (also referred to herein as logic) located in a memory 270.

Figure 2B:
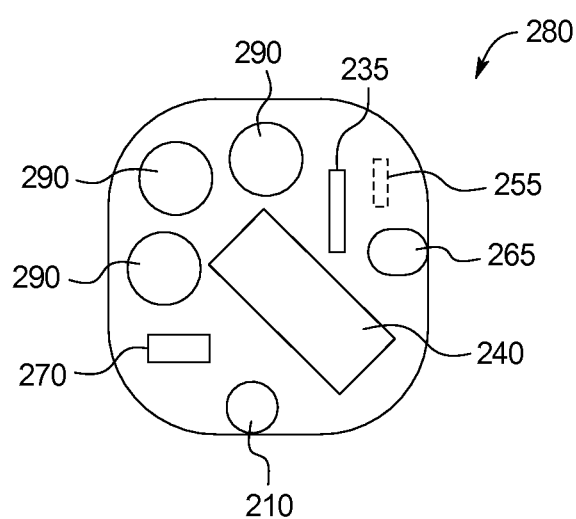
FIG. 2B is an example of peripheral electronics of the system of FIG. 1.

Turning to FIG. 2B, each peripheral 30 may include peripheral electronics 280. The peripheral electronics 280 may be provided as integrated computer units that have radio frequency receiving circuitry and antenna(s) 210. The peripheral electronics 280 may be adapted to allow for a variety of specific actions 340 and peripheral design styles, achieved by different models of peripherals 30, all with similar requirements for receiving communication from the hub 20. The peripheral electronics 280 may be provided as a roughly 1"×1" square component that may fit within a variety of different peripherals 30. The peripheral electronics 280 may include a controller 240 for controlling the peripheral 30 and a memory 270 for storing instructions for carrying out the functionality described herein. The controller may be powered by one or more batteries 290. The peripheral electronics 280 may further include openings for connector jack(s) 260 and antenna(s) 210. The peripheral electronics 280 may include, or may be connected to various audio-visual sensory outputs such as lights 220, a vibrating motor 230, a speaker 250, buzzers, etc. Additionally, the peripheral electronics 280 may include, or may be connect to various input devices, such as microphones 255, accelerometers 235, GPS sensors, etc.

The hub 20 may transmit the data 300 from the antenna 210 via radio frequency to a finite radius around the hub 20 to permit receipt by a peripheral 30. Among other factors, the radius of transmission may be determined by the power of the antenna 210, the power of repeaters, if present, and location and construction of any surrounding obstacles, etc. The hub 20 may then sit idle until further data 300 is received from the source 40.

As noted, the hub 20 receives data 300 for contests 315 and broadcasts it to the peripherals 30. In an embodiment, the hub 20 will track and broadcast data 300 for multiple contests 315 based on selections made by the user 70. The user 70 may select the contests 315 in a setup menu of the hub 20, as described further herein. The hub 20 may be scalable and able to transmit data 300 for numerous specified contests 315 in near real-time.

FIG. 3A is a diagram illustrating the data 300 received and transmitted by the hub 20. As noted, the data 300 may include a series of events 310 relating to one or more contests 315. In an embodiment, each contest 315 includes at least two competitive participants 320 (such as a first competitive participant 322 and a second competitive participant 324) representing the competing parties in the contest 315. In the data 300 shown, the events 310 relate to a baseball game 316, a basketball game 317, a football game 318, and a fantasy sports contest 319.

Each event 310 may relate to an outcome 330 for one of the contests 315. An outcome 330 may include any occurrence during a contest 315 that advances the contest 315. Outcomes 330 may include scoring, assists, hits, fouls, stolen bases, run, yards gained, yards lost, plays, downs completed, change of period, out-of-bounds, turnovers, penalties, bonuses, substitutions, etc. Each outcome 330 may, in turn, include associated competitive participants 320. For example, in the baseball game 316, the outcome 330 is a home run hit by Chicago Cubs player Anthony Rizzo. The associated participants 320 are the Cubs, as the team that scored, and Anthony Rizzo as the player who hit the home run (the outcome 330).

FIG. 3B is a diagram illustrating keys 350 and actions 340 for a peripheral 30. A key 350 may be preprogrammed information stored in the memory 270 of the peripheral that is matched with events 310 received by the peripheral 30 to find matching triggering events 310. Each key 350 may include one or more competitive participants 320 and one or more outcomes 330 for matching with received events 310. As shown in FIG. 3B, each key 350 may have associated actions 340. In an embodiment, a triggering event 310 triggers an associated action 340 or actions 340 to be performed by the peripheral 30. The actions 340 associated with each key 350 may be distinct to permit the user 70 to distinguish different triggering events 310 and permit the user 70 to understand what has occurred. Additionally, different peripherals 30 (even of the same type of peripheral 30) may have different actions 340 associated with the same key 350. Trigger events 310 may be created for any outcome 330, including scoring events, a pass, a penalty, a send-off, an error, a turnover, etc.

Actions 340 may include activating lights 220, playing sounds, creating vibration, or other various audio, visual, or tactile stimuli. Actions 340 may be provided in various patterns and combinations to create unique and varying stimuli. As shown in FIG. 3B, a first set of actions 340 including a first vibration pattern and a first light pattern may be associated with a first key 350, and a second set of actions 340 including a second vibration pattern and a second light pattern may be associated with a second key 350. The lights 220 may be LED lights 220 that may be selectively turned on and off and each light 220 may include individual red, green, and blue LED lights 220 to permit patterns with different activation patterns, colors and sequences. Similarly, actions 340 may include vibration patterns and sound patterns that may have various frequencies, intensities, tempos, pre-recorded patterns, etc.

Each peripheral 30 may include a different mapping of keys 350 to actions 340. For example, a first user and a second user may be rooting for different teams while watching a sports contest 315. The first user may be wearing a jersey 400 for a first participant 322 (the "Indiana Pacers") while the second user 70 is wearing a jersey 400 for the second participant 324 (the "Charlotte Hornets"). Each jersey 400 may have a key 350 in its memory 270 corresponding to the team displayed on the jersey 400. Thus, when Rodney Stuckey of the Indiana Pacers scores as shown in FIG. 3A, the jersey 400 of the first user may light up and vibrate as dictated by the preprogrammed action 340 while the jersey 400 of the second participant 324 performs no action.

In addition to each peripheral including a different set of keys 350, each peripheral 30 may include multiple sets of keys 350. For example, a Colts jersey 400 for Rodney Stuckey may include preprogrammed keys 350 including the Colts and Rodney Stuckey as associated participants 320. Additionally, the Colts jersey 400 may include custom keys 350, such as keys 350 for the user's fantasy team or players. The user 70 may configure the keys 350 of a peripheral using the hub 20, or other programmed device in communication with the peripheral 30.

Figure 4:
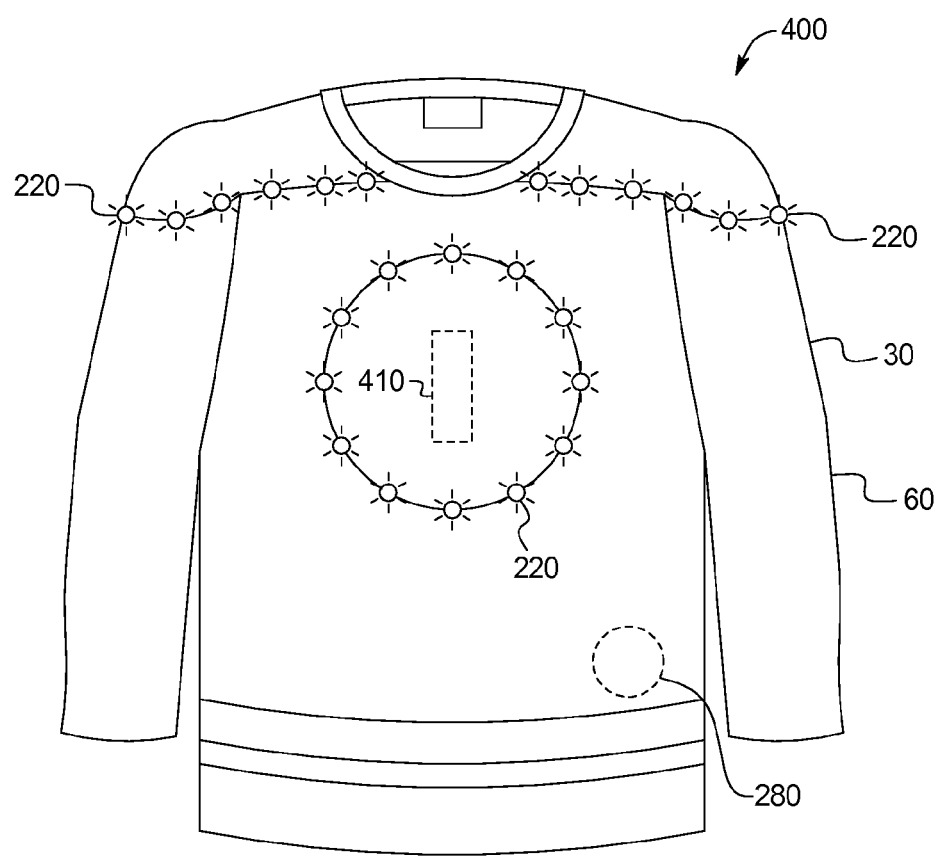
FIG. 4 is an exemplary peripheral embodied in a sports jersey that contains a tactile sensation device.
Figure 5:
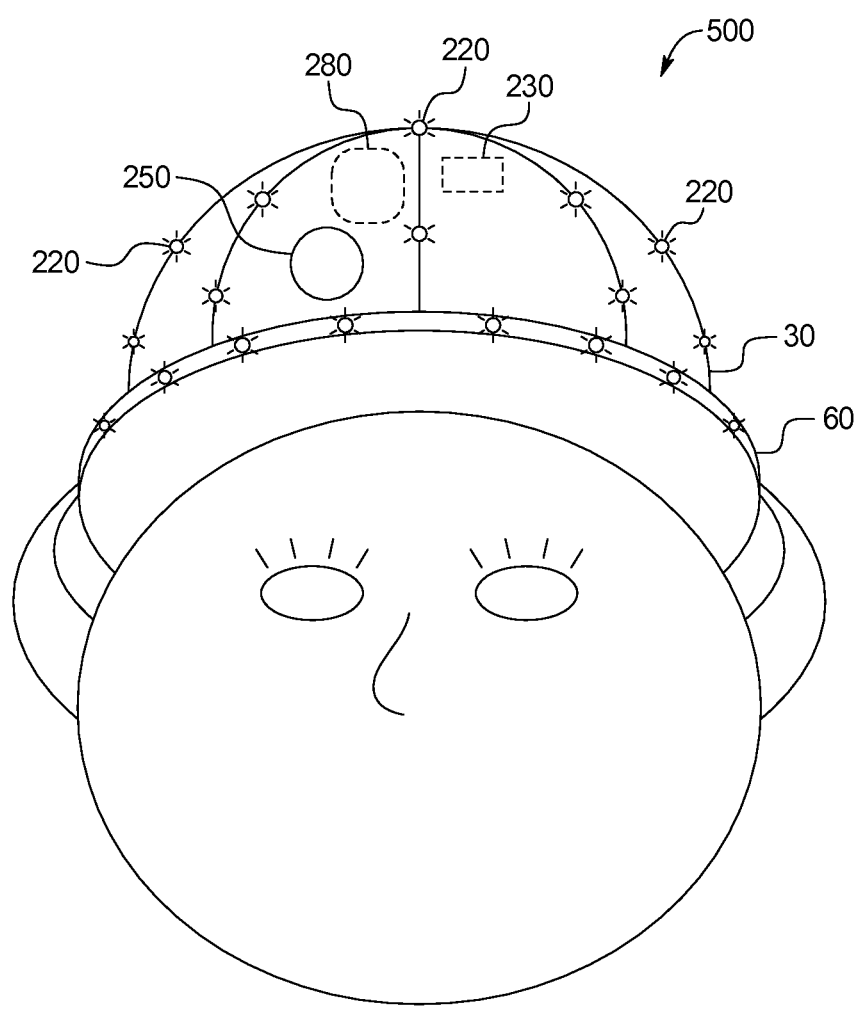
FIG. 5 is an exemplary peripheral embodied in a hat that contains a tactile sensation device.

Turning to FIG. 4, in an embodiment, a peripheral 30 may be a wearable device 60 such as a sports jersey 400. The jersey 400 may include lights 220 arranged on the surface of the jersey 400 in various possible patterns. The jersey 400 may include a tactile sensation device 410 (for example, a Woojer® brand speaker 250, a vibrating motor 230, etc.) that, upon activation by receiving the triggering event 310, creates a tactile sensation for the user 70 wearing the jersey 400. The light 220, tactile sensation device 410, etc., may be electrically connected to the peripheral electronics 280 that may be attached to the jersey 400 at an unobtrusive location.

In another embodiment, a peripheral 30 may be a wearable device 60 such as a hat 500. The hat 500 may also include lights 220, a speaker 250, and vibrating motors 230, integrated into the hat 500 and connected to the peripheral electronics 280. The peripheral electronics 280 may be located on the interior of the hat and contained within a padded compartment to avoid user discomfort.

Figure 6A:
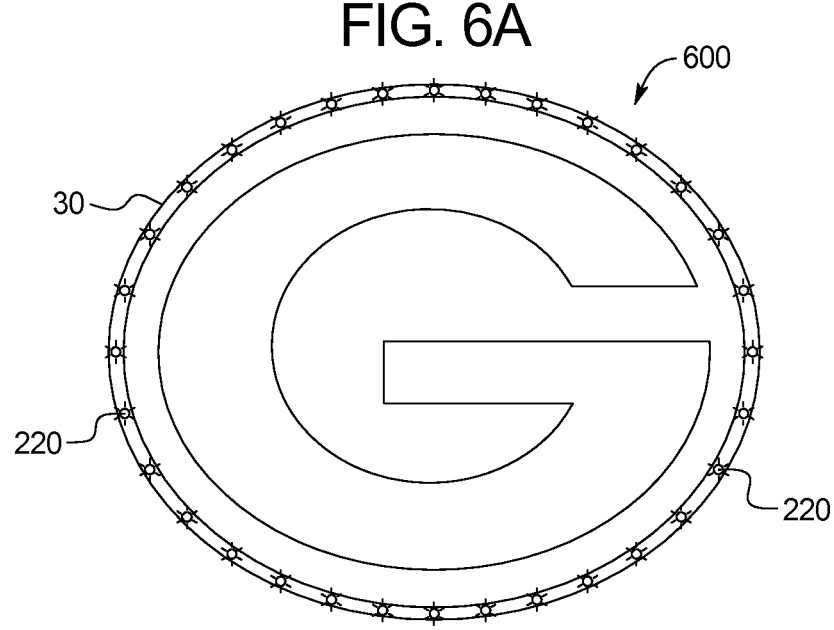
FIG. 6A is an exemplary peripheral embodied in an acrylic sign of the sports team logo, which is comprised of multiple LED lights.
Figure 6B:
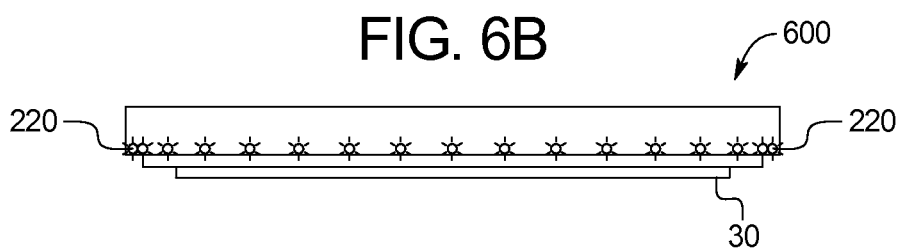
FIG. 6B is an exemplary peripheral embodied in an acrylic sign of the sports team logo, which is comprised of multiple LED lights.
Figure 6C:
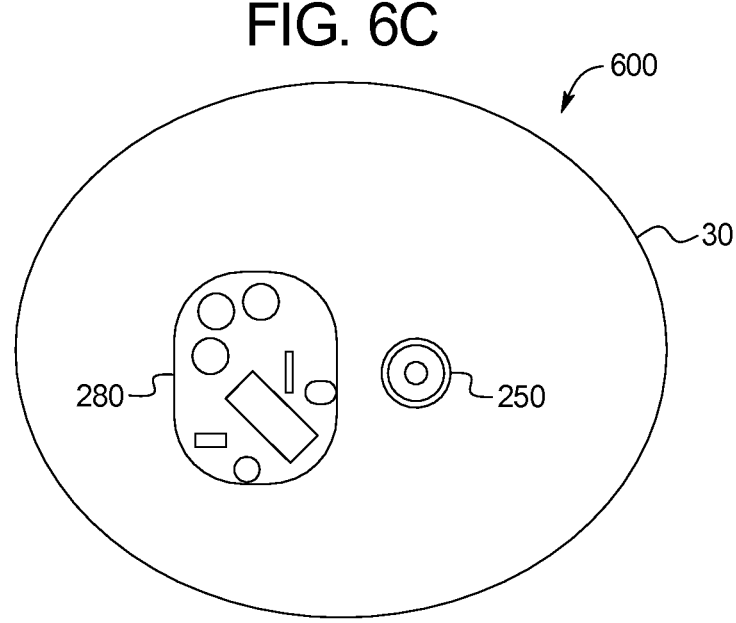
FIG. 6C is an exemplary peripheral embodied in an acrylic sign of the sports team logo, which is comprised of multiple LED lights.

According to an additional embodiment shown in FIGS. 6A-6C, the peripheral 30 may be an acrylic sign 600 of the sports team logo. The sign 600 may include multiple LED lights 220 that, upon activation, display varying patterns of illumination. As shown in FIG. 6C, the peripheral electronics 280 may be connected to the backside of the acrylic sign 600.

Figure 7A:
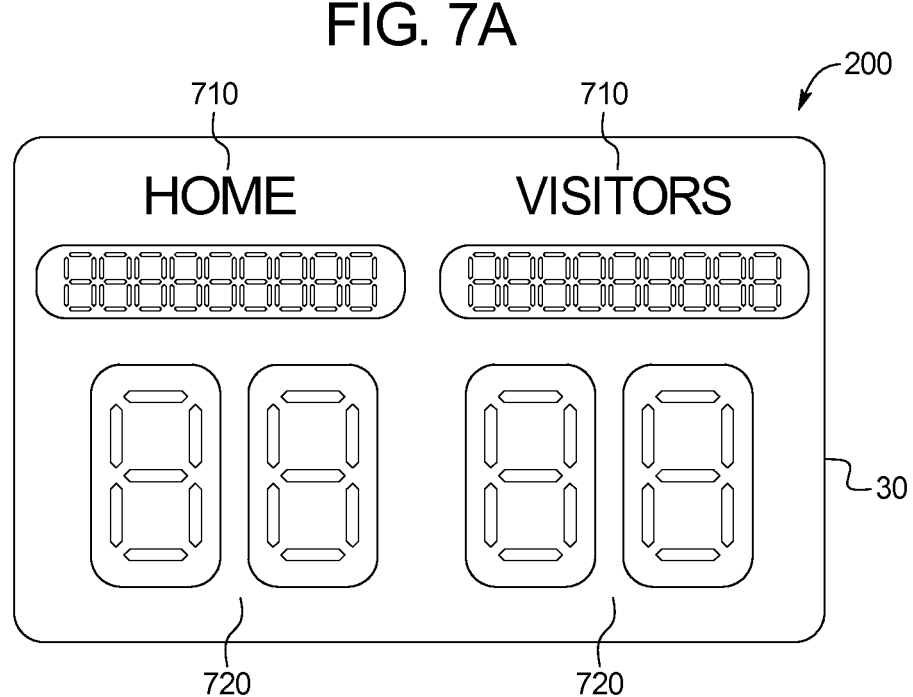
FIG. 7A is an exemplary peripheral embodied in a wall-mounted scoreboard.
Figure 7B:
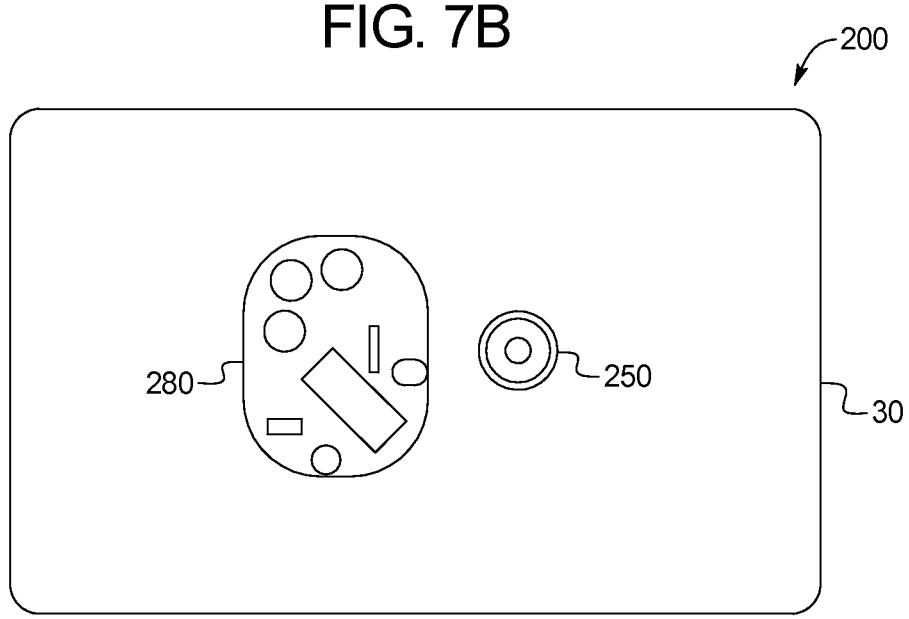
FIG. 7B is an exemplary peripheral embodied in a wall-mounted scoreboard.
Figure 8A:
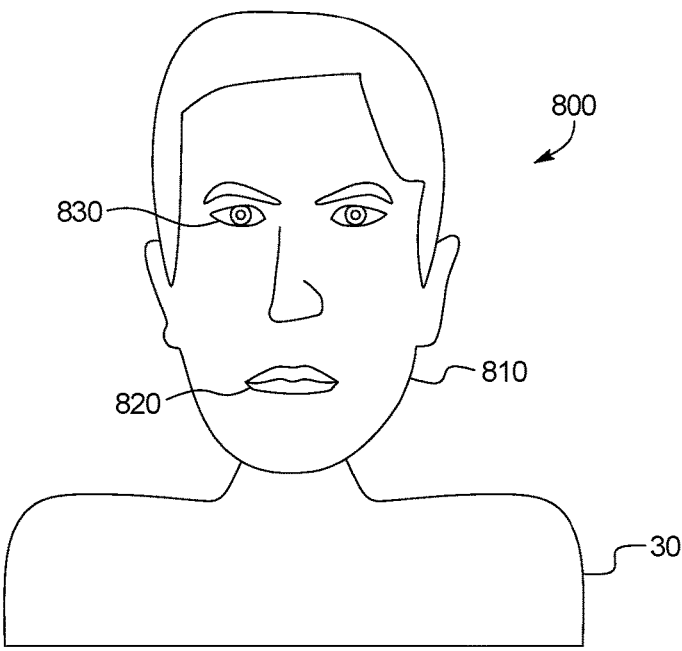
FIG. 8A is an exemplary peripheral embodied in a bust of resemblance to a sports figure with moveable jaw, and/or mouth, and/or eyes as well as a speaker.
Figure 8B:
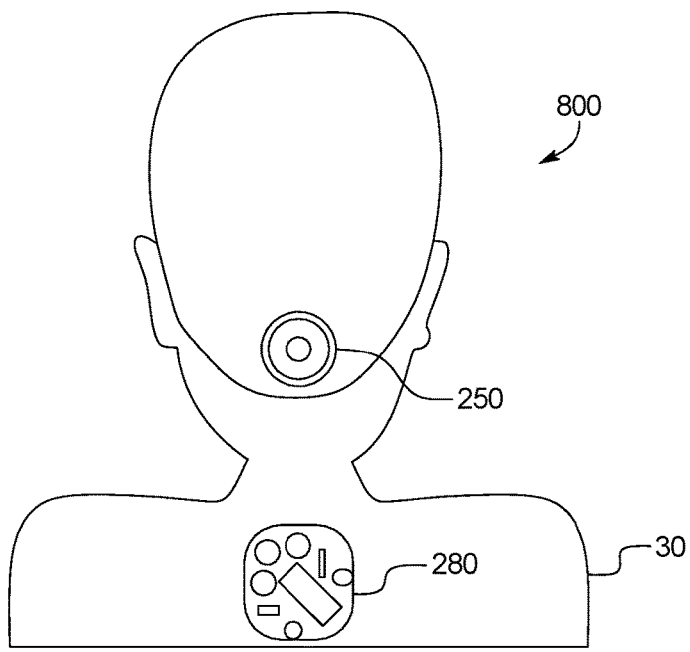
FIG. 8B is an exemplary peripheral embodied in a bust of resemblance to a sports figure with moveable jaw, and/or mouth, and/or eyes as well as a speaker.

In yet another embodiment, shown in FIGS. 7A and 7B, the peripheral 30 may be provided as a scoreboard 700. The scoreboard 700 may display the team names 710 above the respective scores 720 for each team. The peripheral electronics 280 may be connected to the backside of the scoreboard 700. The scoreboard 700 may include keys 350 associated with actions 340 to update the scoreboard 700 to reflect the current score 720. In some embodiments, the scoreboard 700 may display other statistics related to a contest 315, such as turnovers, outs, balls, walks, yards, penalties, current possession, bonuses, etc. In some embodiments, the scoreboard 700 may include a digital display screen controlled by the peripheral electronics 280.

In a further embodiment, the peripheral 30 may be provided as a bust 800 of resemblance to a sports figure. The bust 800 may include a moveable jaw 810, a moveable mouth 820, and moveable eyes 830, each of which may moves in conjunction with the audio that is played from the speaker 250. The bust 800 may include various motors to create the motion of the mouth jaw 810, mouth 820, and eyes 830. The bust 800 may include various actions 340 that trigger the use of the jaw 810, the mouth 820, and the speaker 250. For example, the bust 800 may be provided in the likeness of a famed baseball commentator, such that, when a participant 320 scores, the associated action 340 may trigger simultaneous motion of the jaw 810, mouth 820, and eyes 830 while the speaker plays a sound clip of the well-known commentator in order to create a virtual likeness.

In some embodiments, peripherals 30 may be provided as, or include, home goods, such as, pillows, blankets, throws, comforters clocks, wall art, fat heads (wall-mounted images), rugs, outdoor hanging flags. Each embodiment of a peripheral 30 may include lightup and audio effects. Additionally each peripheral may include team branding. Additionally, the rug may include lights 200 or displays to show player locations in real time.

Other wearable device 60 may include shirts, sweatshirts, sunglasses, sandals, beanies, ties, bow ties, watches, sweatbands, scarves, etc. In some embodiments, peripherals may include office trinkets, such as coffee mugs, mouse maps, and pennants (such as acrylic pennants cases with lights and/or audio to showcase the pennant).

In some embodiments, the peripherals 30 may be a wristband that may be activated if a player scores, gets points, is injured, etc. In some embodiments, the peripherals 30 may include a schedule banner in which a cloth banner may display the schedule of a favorite team and the scores are updated throughout the season as well as live. In some embodiments, the system may include team jerseys 400 for fantasy leagues that may activate when a fantasy team scores. In some embodiments, the system 10 may include leaderboard display that shows the live data for their teams, without needing to view on laptop or mobile app.

Peripherals 30 may be designed to interoperate with hubs 20 owned by various parties. Accordingly, the peripherals 30 may be purchased and carried into a sports contest where the venue may have its own hub 20 that will activate all fans' peripherals 30 simultaneously. In an idle state, a peripheral 30 may perform standard actions that may be programmed from the hub 20. These actions 340 may include flashing lights, clock, or a game countdown display.

Turning to FIG. 9, in an embodiment, the event entertainment system 10 may include two-way communication between peripherals 30 to create actions 340 that are coordinated across peripherals 30. In an exemplary use case, a user 70 wearing a wearable device 60, such as a jersey 400, may be in a stadium enjoying a sports contest. To amplify the energy and excitement of the contest 315, the wearable devices 60 may include activated sensory outputs such as lights 220, speakers 250, vibrating motors 230, tactile sensation device 410, etc., that when activated light up, make sound, or vibrate in response to the activity of the user 70 and nearby users 70. For example, if the user 70 moves quickly by waving her hands, jumping up and down, rocking back and forth, etc., the activated sensory outputs may be activated.

Additionally, via two-way communication, the motion of one user 70 may activate the wearable device 60 of nearby users 70. For example, the activity of a first user 70 wearing a first wearable device 510 may broadcast a signal 920 that causes a second wearable device 520 worn by a second user 70 to light up. In the extreme, the wearable devices 60 may form a network across the stadium, such that when activity in a particular area reaches an activation point, the activation of the wearable devices 60 may spread out in a wave across the stadium. For clarity, although some functionality herein is described with reference to wearable devices 60, it is understood that any peripheral 30 may benefit from the described functionality, and, accordingly all descriptions of the functionality of wearable devices 60 is intended to apply equally to any peripheral 30.

Figure 9A:
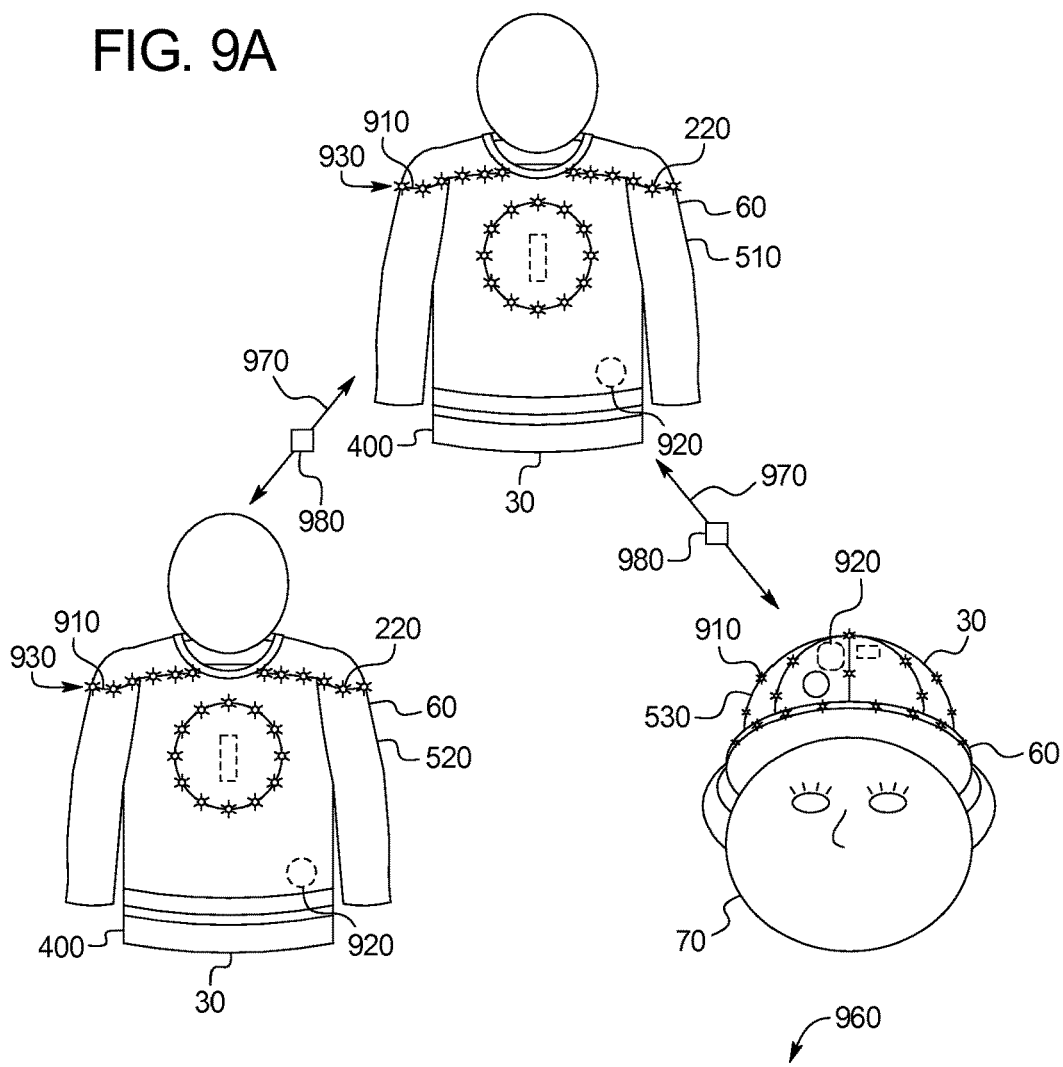
FIG. 9A is an exemplary peripheral embodied in a sports jersey that contains a tactile sensation device.

In an embodiment, shown in FIG. 9A, a first wearable device 510 may include the peripheral electronic of FIG. 2B. The first wearable device 510 may include an activity measurement device 920 to measure the activity of the user 70. In an embodiment, the activity measurement device 920 may be or include an accelerometer 235, or in other embodiments, the activity measurement device 920 may be or include a microphone 255. The activity of the user 70 measured by the activity measurement device 920 may activate an activated output 930 of the sensory output device 910, such as turning on the lights 220.

Figure 9B:
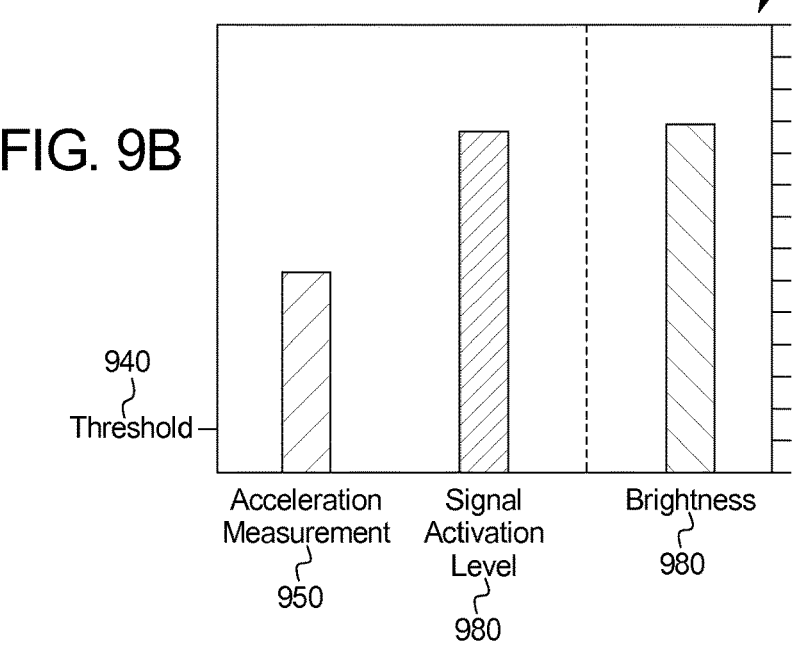
FIG. 9B is a bar chart illustrating the relationship between user activity, a received signal, and an activated output of the sports jersey of FIG. 9A.

In an embodiment, as shown in FIG. 9A and FIG. 9B, the sensory output device 910 may display an activated output 930 when the user activity exceeds a predetermined threshold level 940. For example, the user activity may be observed using an acceleration measurement 950, and the sensory output device 910 may be the lights 220. As the user moves while cheering, the controller 240 may receive acceleration data points from the accelerometer 235. As shown in the bar chart of FIG. 9B, the controller 240 may then calculate an acceleration measurement 950, such as, a moving average of the magnitude of the acceleration data points. When the moving average exceeds the predetermined threshold level 940, the activated output 930 of activating the lights 220 may be enabled.

As another example, the user activity may be an audio input received by a microphone 255, and the sensory output device 910 may be a speaker 250. As the user 70 cheers, the controller 240 may receive an audio input measurement, such as the volume received from the microphone 255. Alternatively, the audio input measurement may be frequency, pitch, tone, etc. When the volume exceeds a predetermined threshold level 940, the controller 240 may play back sounds from the speaker 250.

In some embodiments, the acceleration measurement 950 may be a measurement of a frequency of acceleration direction changes in the acceleration data points, a measurement calculated by taking a derivative of the acceleration (also known as jerk), an integration of the acceleration data (such as velocity), or any other magnitude derived from the acceleration data points capturing the intensity of user movement, as will be apparent to those of skill in the art from the examples provided herein.

In another embodiment, the activated output 930 of the sensory output device 910 may have a range of intensity levels 960. For example, in an embodiment where the sensory output device 910 includes lights 220, the intensity levels 960 may be various brightness levels of the lights 220. Alternatively, in some embodiments, the intensity levels 960 may be various levels related to the color of the lights 220, the frequency of turning the lights off and on, the user of spatial patterns of light, etc. As another example, in embodiments where the sensory output device 910 includes a speaker, the intensity level may be a volume of sounds that are played back, a frequency variation in the sounds, the tempo of the sounds, etc.

In an embodiment, an activation level 980 of the activated output 930 is set proportional to the measured user activity. For example, when the user activity is measured using an acceleration measurement 950 from the accelerometer 235, the activated output 930 may be set at an intensity level 960 proportional to the acceleration measurement 950. As another example, when the user activity is measured using an audio input measurement, the activation level 980 of the activated output 930 may be proportional to the audio input measurement.

The activated output 930 of one wearable device 60 may be influenced by the activity of other nearby users 70. In an embodiment, the intensity level 960 of the activated output 930 may be proportional to a signal 970 received from another peripheral 30, such as a wearable device 60. As shown in FIG. 9A, a second wearable peripheral 520 may broadcast a signal to the first wearable peripheral 510. The signal 970 may include an activation level 980. In an embodiment, the activation level 980 may be a measure of the user activity. For example, the activation level 980 may be the acceleration measurement 950 as measured by the second wearable peripheral 520. The controller 240 may then activate the sensory output device 910 to the intensity level 960 proportional to the acceleration measurement 950. By providing wearable devices 60 that react to the activity of nearby sports fans, it is believed the event entertainment system 10 will encourage fans to increase their activity, thus increasing fan engagement and excitement.

Further, each wearable peripheral 60 may broadcast a signal 970 incorporating the activity it receives from other wearable peripherals 60. For example, a first wearable device 510 may receive signals 970 from a second wearable device 520 and a third wearable device 530. The first wearable device 510 may then integrate the signals 970 from the second wearable device 520 and the third wearable device 530 and broadcast a new signal 970 that may be observed by further wearable peripherals 60. Additionally, the first wearable device 510 may additionally integrate its own activation level 980 into the new signal 970. It is contemplated that any information measured by the first wearable device 510 may be included in the new signal 970. By integrating signals 970 and broadcasting new signals 970, each wearable device 60 may amplify the activation level 980 of all wearable devices 60 to create increased energy and excitement at a sports contest.

To provide further modes of engagement, the peripherals 30 at a sports contest may receive additional codes from the hub operator to sync together. For example, all jerseys 400 of one team light up in the stadium when their team has the ball. Then when a turnover occurs, all of those jerseys 400 may turn off and the opposing team's jerseys 400 light up. This may occur at certain times in order to create additional excitement, such as a power play in hockey or while a team is in the Red Zone in football.

The event entertainment system 10 may also work with non-sporting events to alert users 70 to critical moments or to heighten the experience for fans. For example, a fan may use the event entertainment system 10 to follow a favorite contestant on a reality TV show. In another example, peripherals 30 may be sold as t-shirts at a concert, which will then be activated throughout the concert to coordinate with the set list. As a further example, the event entertainment system 10 may also be used in a symphony to highlight certain areas of the venue or to vibrate a peripheral 30 upon a crescendo. Even further, the system 10 may be used on a cruise ship to alert travelers of different cruise events taking place. Moreover, in a corporate office, the event entertainment system 10 may include a peripheral 30 to signify the open or close of the market or act as a "ticker" to track sales and alert team members of a new sale. Thus, the system 10 may help drive competition and excitement among employees.

In the home or office, the event entertainment system 10 may alert users about new emails or social media events, such as "tweets." Similarly, corporations may also use the event entertainment system 10 in a social media context by illuminating a trending sign that displays trending "tweets." The trending sign may stay lit for a certain amount of time following a tweet, and the more tweets per day, the longer the sign stays lit. This could help to drive a marketing team's engagement with various campaigns.

In an embodiment, the wearable devices 60 may activate nearby wearable devices 60 by moving around with the accelerometer 235. In one embodiment, users 70 may participate or activate a digital light "wave" of all wearable devices 60 in the venue. The wearable devices' wave may be coordinated by the hubs 20 and controlled by the stadium staff. In an example, a wave may be started when an announcer announces on a Jumbotron that the wave is going to start, and asking who wants to lead the action. The users 70 of the wearable devices in the stadium may jump and cheer to activate their wearable devices 60. The hubs 20 may measure the activity, and the Jumbotron may show a dB or activity scale that climbs until the critical "activation point" is reached. The wave may then start with the most active person and spreads out from there with a wave of lights around the venue.

In another embodiment, fans wearing wearable devices 60 may participate in half-time raffle comprised of randomly selecting a particular shirt ID number and awarding a price to the person wearing it. This may be accomplished the stadium staff cutting the lights at halftime, and quickly flashing of all wearable devices in the stadium randomly via the hubs 20. The flashing slows down gradually and ending with just one wearable device 60 lit in the entire stadium—thus revealing the person who won a prize.

In some embodiments, wearable devices may save an ID number of the venue they attend from the venue hub 20, which is then uploaded to the user's mobile phone or hub 20 when they return home. The ID number and other collected information may be stored and added to the user's profile, potentially unlocking various achievements. For example, an achievement may include attending one hundred games that year. As another example, an achievement may include attending events for five different sports that year. As a further example, an achievement may include the number of times the user 70 attended her favorite bar X (e.g., "attended X fifteen times").

This information may be used to identify trends in fan (user) activity and preferences. For example: Blackhawk fans on average go to the live game 2 times per season but to a favorite sports bar 15 times per season. Bars may subscribe to certain data to allow catering to fans and provide additional discounts or offers to loyal patrons. Bars may also compete with other bars to show how many active users they have on any game day. Additionally, bars may receive special spotlight status on mobile app and website identifying them as most active/influential bar status. Further, sports fan may be enabled to logon to see how "active" a bar is on a given day, encouraging them to go where the action is happening, which in turn increases bar attendance and revenue.

Returning to FIG. 1 and FIG. 2A, the hub 20 may be sized to be useable in residential and commercial applications and establishments. The hub 20 may be constructed of a plastic or metal housing consisting of two primary parts, an example being a top and bottom, which come together to form the housing. According to an exemplary embodiment, the hub 20 is a plastic box, comprised of a lid and base. The hub may contain a circuit board comprised of integrated circuits, microprocessors, lights, antenna(s), buttons, speakers, microphones 255, and motors.

The hub 20 may be manufactured using circuit boards, wiring, connectors and integrated circuit chips, etc. The logic within the hub 20 may be upgraded, should the need arise from time to time. In the event an upgrade is warranted, the manufacturer or user, as defined by the scope of upgrade, may connect to the hub through a setup menu to initiate the update.

In an embodiment, the hub 20 may be provided as a dedicated unit for placement in a home or business. Alternatively, in some embodiments, the hub 20 may be a tablet, cellphone, laptop computer, etc, running an application to provide the functionality described herein. The hub 20 may communicate with user devices, such as a tablet, smartphone, laptop computer, etc. and accept input from one of the user devices as a source 40.

The data 300 that the hub 20 receives from the source 40 may be based on a subscription service. This subscription service may require monthly or annual fees as established by the manufacturer and the source 40, for access and connectivity to the data 300 that the source 40 serves and the hub 20, in turn, receives. The fees for continuation of service from the source 40 may be waived for a time with purchase of additional hubs 20 or peripherals 30.

The hub 20 may contain a setup menu, for example, the setup menu may be constituted by web pages that are provided via an internal web server. The web server may be provided as an application stored in the memory 270 executed by the controller 240. The web server may be accessible via computer or mobile device on the same network as the hub. The user 70 may access the setup menu in order to configure the settings of the hub 20 as desired. The settings that the user 70 is able to customize include, but are not limited to, types of sports and contests that the user 70 is tracking, the specific teams or games that the user 70 is tracking, the selection of fantasy teams that the user 70 is tracking, and the types of data that the hub is tracking.

The hub 20 may include connection jacks 260, antenna(s) 210, LEDs 220 (or other lights), gears, vibrating motors 230 (or other buzzers), speakers 250, etc. The hub 20 may communicate with the source 40 continuously or intermittently as defined by the logic, the source 40, and/or the user 70.

Similar to the hub 20, various peripherals 30 are sized to be useable in residential and commercial applications or establishments. Each peripheral 30 may be of static construction, meaning that the item is purchased for a specific sport or team and with a specific style and display function pre-determined. Peripherals 30 may have setup buttons, which sync with the hub and receive settings for new signals over the air (RF transmissions).

The peripheral electronics 280 may act as a standard platform by which all of the varying embodiments of the peripherals 30 are connected. The logic within the peripherals may be upgraded, should the need arise from time to time. In the event an upgrade is warranted, the manufacturer or user, as defined by the scope of upgrade, may connect the peripheral 20 to the hub via upgrade cable.

One or more controllers 240 control aspects of the systems and methods described herein. The one or more controllers 240 may be adapted to run a variety of application programs, access and store data, including accessing and storing data in associated databases, and enable one or more interactions. Typically, the one or more controllers 240 are implemented by one or more programmable data processing devices. The hardware elements, operating systems, and programming languages of such devices are conventional in nature, and it is presumed that those skilled in the art are adequately familiar therewith.

For example, the one or more controllers 240 may be a PC based implementation of a central control processing system utilizing a central processing unit (CPU), memories and an interconnect bus. The CPU may contain a single microprocessor, or it may contain a plurality of microcontrollers 240 for configuring the CPU as a multi-processor system. The memories include a main memory, such as a dynamic random access memory (DRAM) and cache, as well as a read only memory, such as a PROM, EPROM, FLASH-EPROM, or the like. The system may also include any form of volatile or non-volatile memory. In operation, the main memory stores at least portions of instructions for execution by the CPU and data for processing in accord with the executed instructions.

The one or more controllers 240 may also include one or more input/output interfaces for communications with one or more processing systems. Although not shown, one or more such interfaces may enable communications via a network, e.g., to enable sending and receiving instructions electronically. The communication links may be wired or wireless.

The one or more controllers 240 may further include appropriate input/output ports for interconnection with one or more output displays (e.g., monitors, printers, touchscreen, motion-sensing input device, etc.) and one or more input mechanisms (e.g., keyboard, mouse, voice, touch, bioelectric devices, magnetic reader, RFID reader, barcode reader, touchscreen, motion-sensing input device, etc.) serving as one or more user interfaces for the processor. For example, the one or more controllers 240 may include a graphics subsystem to drive the output display. The links of the peripherals to the system may be wired connections or use wireless communications.

Although summarized above as a PC-type implementation, those skilled in the art will recognize that the one or more controllers also encompasses systems such as host computers, servers, workstations, network terminals, and the like. Further one or more controllers may be embodied in a mobile device, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a processor or other programmable equipment to perform the relevant steps, where the code or instructions are carried by or otherwise embodied in a medium readable by the processor or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. An event entertainment system comprising:
    a first wearable device associated with a first competitive participant worn by a first person;
    a second wearable device associated with a second competitive participant worn by a second person;
    wherein the first wearable device and the second wearable device include wireless communication modules that receive data related to one or more contests;
    a hub that receives and wirelessly broadcasts the data related to the one or more contests;
    a controller that controls the first and second wearable devices, wherein the controller is included in the hub; and
    a memory in communication with the controller, the memory including instructions that, when executed by the controller, cause the controller to:
        receive the data related to the one or more contests from one or more subscriptions to media channels broadcasting the one or more contests over a network, wherein the data related to the one or more contests includes a stream of events related to at least the first competitive participant and the second competitive participant, wherein the data for each event identifies an outcome and one of the first competitive participant and the second competitive participant,
        broadcast data to the first and second wearable devices over a network;
        activate the first wearable device in response to a first trigger event to perform an action, wherein the first trigger event includes a first outcome associated with the first competitive participant, and wherein the second wearable device does not perform the action; and
        activate the second wearable device in response to a second trigger event, wherein the first trigger event and the second trigger event are different.

2. The event entertainment system of claim 1, wherein the first and second competitive participants are sports teams.

3. The event entertainment system of claim 1, wherein the first and second competitive participants are sports players.

4. The event entertainment system of claim 1, wherein the first and second competitive participants are fantasy sports teams.

5. The event entertainment system of claim 1, wherein the action is one of activating lights attached to the first wearable device, activating a vibrating motor of the first wearable device, and playing an audio recording through a speaker attached to the first wearable device.

6. The event entertainment system of claim 1, wherein the action is one or more of activating lights attached to the first wearable device, activating a vibrating motor of the first wearable device, and playing an audio recording through a speaker attached to the first wearable device.

7. The event entertainment system of claim 1, wherein the first trigger event is one of a scoring event, a pass, a penalty, a send-off, an out, an error, and a turnover.

8. The event entertainment system of claim 1, wherein the first wearable device is one of a hat, a sign, an armband, a shirt, a bust, and a scoreboard.

9. The event entertainment system of claim 1, wherein, in response to a second trigger event, the first wearable device performs a second action, wherein the second trigger event includes a second outcome associated with a third competitive participant.

10. The event entertainment system of claim 1, wherein the first wearable device further includes an accelerometer, a sensory output device, and a further controller in communication with the accelerometer, the sensory output device, and the wireless communications module;
wherein the sensory output device, when activated by the further controller, produces an activated output, the activated output having a range of intensity levels,
wherein in response to measuring an acceleration measurement from the accelerometer, the further controller activates the activated output to a selected intensity level proportional to the acceleration measurement,
wherein the further controller broadcasts, via the wireless communication module, a first activation level derived from the acceleration measurement, and
wherein the further controller receives, via the wireless communication module, a second activation level from a second wearable device, wherein the further controller activates the activated output to a selected intensity level proportional to the second activation level.

11. The event entertainment system of claim 10, wherein the output device is a plurality of lights, wherein the activated output is the display of light from the lights, wherein the intensity levels are brightness levels of the displayed light.

12. The event entertainment system of claim 10, wherein the output device is a speaker, wherein the activated output is the playback of sounds from the speaker, wherein the intensity levels are volume levels of the sounds.

13. The event entertainment system of claim 10, wherein the second activation level is derived from a second acceleration measurement from a second accelerometer connected to the second wearable device.

14. The event entertainment system of claim 10, wherein the further controller broadcasts, via the wireless communication module, a third activation level derived from the acceleration measurement and the second activation level from the second wearable device.

15. An event entertainment system comprising:
a first wearable device including an accelerometer, a sensory output device, a wireless communications module, and a controller in communication with the accelerometer, the sensory output device, and the wireless communications module, wherein the first wearable device is associated with a first competitive participant worn by a first person;
wherein the sensory output device, when activated by the controller in response to a first trigger event based on a first outcome associated with the first competitive participant, produces an activated output, the activated output having a range of intensity levels,
wherein in response to measuring an acceleration measurement from the accelerometer, the controller activates the activated output to a selected intensity level proportional to the acceleration measurement,
wherein the controller broadcasts, via the wireless communication module, a first activation level derived from the acceleration measurement, and
wherein the controller receives, via the wireless communication module, a second activation level from a second wearable device worn by a second person, wherein the controller activates the activated output to a selected intensity level proportional to the second activation level.

16. The event entertainment system of claim 15, wherein the output device is a plurality of lights, wherein the activated output is the display of light from the lights, wherein the intensity levels are brightness levels of the displayed light.

17. The event entertainment system of claim 15, wherein the output device is a speaker, wherein the activated output is the playback of sounds from the speaker, wherein the intensity levels are volume levels of the sounds.

18. The event entertainment system of claim 15, wherein the second activation level is derived from a second acceleration measurement from a second accelerometer connected to the second wearable device.

19. The event entertainment system of claim 15, wherein the controller broadcasts, via the wireless communication module, a third activation level derived from the acceleration measurement, and the second activation level from the second wearable device.

* * * * *